(12) United States Patent
Lang (10) Patent No.: US 12,320,482 B2
(45) Date of Patent: Jun. 3, 2025

(54) LIGHTING COMPONENT, TRANSPORTATION DEVICE AND METHOD FOR PRODUCING A LIGHTING COMPONENT

(71) Applicant: Bayerische Motoren Werke Aktiengesellschaft, Munich (DE)

(72) Inventor: Andreas Lang, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/569,253

(22) PCT Filed: Jul. 29, 2022

(86) PCT No.: PCT/EP2022/071299
§ 371 (c)(1),
(2) Date: Dec. 12, 2023

(87) PCT Pub. No.: WO2023/012046
PCT Pub. Date: Feb. 9, 2023

(65) Prior Publication Data
US 2024/0247774 A1    Jul. 25, 2024

(30) Foreign Application Priority Data

Aug. 6, 2021 (DE) ...................... 10 2021 120 550.6

(51) Int. Cl.
*F21S 41/24* (2018.01)
*F21S 43/241* (2018.01)
(Continued)

(52) U.S. Cl.
CPC ............. *F21S 41/24* (2018.01); *F21S 43/241* (2018.01); *F21Y 2115/10* (2016.08); *F21Y 2115/30* (2016.08)

(58) Field of Classification Search
CPC ... F21Y 2115/10; F21Y 2115/30; F21S 41/24; F21S 43/241; B60Q 1/32; B60Q 1/30;
(Continued)

(56) References Cited

U.S. PATENT DOCUMENTS

| 8,043,672 B2 * | 10/2011 | Ikeda ...................... F21S 43/26 |
| | | 428/34.1 |
| 2009/0141512 A1 * | 6/2009 | Eberwein ................ B60R 13/10 |
| | | 362/497 |

(Continued)

FOREIGN PATENT DOCUMENTS

| DE | 10 2004 028 970 A1 | 2/2006 |
| DE | 10 2010 018 033 A1 | 10/2011 |

(Continued)

OTHER PUBLICATIONS

International Search Report (PCT/ISA/210) issued in PCT Application No. PCT/EP2022/071299 dated Dec. 22, 2022 with English translation (4 pages).

(Continued)

*Primary Examiner* — Omar Rojas Cadima
(74) *Attorney, Agent, or Firm* — Crowell & Moring LLP (57) ABSTRACT

A lighting component for a transportation device includes a support layer arrangement of which at least some portions are light-permeable and which has a first layer. The first layer has a first index of refraction and a light guiding element made of polyurethane on a first surface of the first layer. The light guiding element has a second index of refraction which is greater than the first index of refraction. The light guiding element has a coupling-in portion for coupling in light from a light source into the light guiding element and is configured to guide the coupled-in light along the first layer. The lighting component also has a coupling-out portion which is configured to couple the light out of the (Continued)

light guiding element at least partially in the direction of the support layer arrangement.

13 Claims, 4 Drawing Sheets

(51) Int. Cl.
*F21Y 115/10* (2016.01)
*F21Y 115/30* (2016.01)

(58) Field of Classification Search
CPC ............... F21W 2111/02; G09F 13/18; G02F 1/133615; G02B 6/0095; G02B 5/124; G02B 6/0041
See application file for complete search history.

(56) References Cited

U.S. PATENT DOCUMENTS

| | | | |
|---|---|---|---|
| 2011/0134623 A1* | 6/2011 | Sherman | G02B 6/005 362/19 |
| 2011/0187967 A1 | 8/2011 | Shinohara et al. | |
| 2013/0114292 A1 | 5/2013 | Brick et al. | |
| 2013/0170218 A1* | 7/2013 | Wolk | G02B 6/005 362/296.01 |
| 2018/0074251 A1 | 3/2018 | Berard et al. | |
| 2019/0235153 A1 | 8/2019 | Neyer et al. | |

FOREIGN PATENT DOCUMENTS

| | | |
|---|---|---|
| WO | WO 2013/028467 A1 | 2/2013 |
| WO | WO 2016/156721 A1 | 10/2016 |
| WO | WO 2018/065463 A1 | 4/2018 |

OTHER PUBLICATIONS

German-language Written Opinion (PCT/ISA/237) issued in PCT Application No. PCT/EP2022/071299 dated Dec. 22, 2022 with English translation (7 pages).

German-language Search Report issued in German Application No. 10 2021 120 550.6 dated May 18, 2022 with partial English translation (11 pages).

\* cited by examiner

LIGHTING COMPONENT, TRANSPORTATION DEVICE AND METHOD FOR PRODUCING A LIGHTING COMPONENT

BACKGROUND AND SUMMARY

The present invention relates to a lighting component for a transportation device, to a transportation device comprising the lighting component, and to a process for producing the lighting component.

Transportation devices, especially vehicles, for example land vehicles, aircraft and watercraft, are provided with a lighting device for better visibility in the dark or bad weather. In the case of known motor vehicles, the lighting device comprises vehicle lights, typically in the form of front, rear and side lights.

A vehicle light known from the prior art is disclosed in document DE 10 2004 028 970 A1. The light is designed as a signal light and consists essentially of a light guide element, a light source and a coating. The light guide element has a light exit face on its front side in emission direction, and a reflection face on its rear side. Light coupled into the light guide element via a light input coupling surface is transmitted within the light guide element, and light arriving at the reflection face is deflected toward the light exit face and exits therefrom in emission direction.

Against this background, it is an object of the present invention to provide a lighting component which is producible relatively easily, efficiently and inexpensively and, in the development of a transportation device, can be integrated flexibly into the transportation device. It is a further object to provide a transportation device having such a lighting component, and a process for producing the lighting component.

This object is achieved by a lighting component, a transportation device and a process for producing a lighting component according to the claimed invention.

The lighting component comprises a carrier layer arrangement which is transparent at least in sections and has a first layer and at least one light guide element made of polyurethane on a first surface of the first layer. The first layer has a first refractive index and the light guide element has a second refractive index. The second refractive index is greater than the first refractive index. The light guide element has an input coupling section for input coupling of light from a light source into the light guide element and is set up to guide the coupled-in light, especially by way of total reflection, along the first layer. In addition, the lighting component has an output coupling section set up to outcouple the light from the light guide element at least partly in the direction of the carrier layer arrangement.

The lighting component of embodiments of the invention can be designed in a comparatively simple and free/flexible manner, and hence configured in the development of the transportation device. The lighting component may especially be produced by multicomponent injection molding. The carrier layer arrangement may be formed first and offers a basis for an extremely flexibly designable light guide element.

Since the light guide element has been produced from polyurethane, the liquid that reacts to give polyurethane in the cavity of the injection mold can flow onto the carrier layer arrangement and even into fine depression structures (for instance on the surface of the mold) in order to form comparatively sharp-edged structures in the light guide element. This firstly opens up new freedom of design in the shaping, for example in the region of the outer skin of the body work or in the interior of the transportation device/ vehicle. Secondly, this can reduce complexity both in the production of the lighting component and of the transportation device, and in the repair of the transportation device. It may even be conceivable to configure comparatively large components such as a bumper cladding as integral lighting component. As an additional synergistic effect that results from the interplay of carrier layer arrangement and light guide element, it is possible to design the output coupling section in a comparatively simple manner in the polyurethane material. A further synergistic effect is that the lighting component can easily be designed so as to be free of blind spots for vehicle sensors, for example radar sensors or infrared sensors, such that such sensors can be covered by way of the lighting component.

In the context of this disclosure, the word "on" in association with the layer arrangement is preferably understood to mean directly and/or essentially over the full area. What may be meant here by "essentially over the full area" is that a layer, aside from manufacturing tolerances, is in contact with an adjacent layer by its entire surface area facing the adjacent layer. In particular, the light guide element may be formed directly on the first layer. In this case, the light guide element may be in direct contact with the first layer over its surface area facing the first layer, or even over its entire surface area facing the first layer. Alternatively, it is conceivable that the word "on" is understood to mean indirectly, for instance via an interlayer. The light guide element made of polyurethane, the first layer and/or the second layer elucidated below in the carrier layer arrangement each take the form of solid (bulk) material. Aside from any manufacturing tolerances, the material of these layers may thus be essentially free of trapped air or other defects.

The light guide element preferably makes contact with the first layer. The light guide element and the first layer may be bonded directly and/or cohesively to one another. In particular, the light guide element may be shaped/cast onto the first layer, such that the polyurethane material of the light guide element can join the material of the first layer. Polyurethane, by definition, is a polymer or synthetic resin formed from the polyaddition reaction of polyol (especially dialcohol) with polyisocyanate. While polyurethane may essentially take the form of a thermoset, thermoplastic or elastomer, the polyurethane of the light guide element is preferably a thermoset, or alternatively a thermoplastic, material. The light guide element is preferably (clearly or chromatically) transparent in its interior. The first and/or second layers of the carrier layer arrangement are preferably also (clearly or chromatically) transparent.

The geometry of the light guide element can in principle be chosen freely. In particular, the light guide element may be configured, in sections or completely, with an areal, linear or striped, sculptured and/or three-dimensional structure. If the light guide element comprises or takes the form of a flat light guide layer (called an areal light guide) on the first layer, its extent along an interface with the first layer in two mutually orthogonal directions may be greater than, especially at least twice or three times greater than, the layer thickness of the light guide element. Alternatively, the light guide element may be formed at least in sections as an elongated and/or linear light guide strip that extends along the first surface of the first layer. In addition, one or more further light guide elements each with one or more accompanying light source(s) may be formed on the first surface of the first layer. Each of the further light guide elements and each accompanying light source may have any desired features of the light guide element described in detail here or of the light source described in detail here. For example, the light guide element may take the form of an areal light guide, and a first further light guide element that of a light strip on the first surface of the first layer.

The input coupling section is preferably formed laterally along the first layer of the light guide element. The input coupling section is preferably produced from the same polyurethane as the light guide element. The input coupling section may be in monolithic form with the remainder of the light guide element. The thickness of the light guide element may also increase toward the edge of the light guide element in the region of the input coupling section. This makes it possible to couple light from the light source into the light guide element and simultaneously to keep attenuation losses caused by the material of the light element comparatively low.

The carrier layer arrangement may also comprise a second layer. The second layer may be formed on the first layer, especially directly on a second surface of the first layer on the opposite side from the light guide element. The light guide element, the first layer and the second preferably form a cohesive layer structure. The second preferably takes the form of a carrier layer and has higher stiffness, hardness and/or strength than the first layer. The first and/or second layers preferably take the form of thermosets or thermoplastics. The first layer may take the form of a film on the second layer, in which case the layer thickness of the first layer may be lower than the layer thickness of the second layer. The material of the second layer may be polycarbonate, for example. The layer thickness of the first layer may, for example, be not more than one fifth or not more than one tenth of the layer thickness of the second layer.

The refractive indices of the light guide element and of the first layer are chosen such that the light can be coupled quite easily into the light guide element and can spread efficiently under total reflection within the light guide element. For this purpose, the first refractive index is lower by at least 0.05 or at least 0.1 or at least 0.15 or at least 0.2 than the second refractive index. The first refractive index is preferably between 1.3 and 1.4, for example 1.35. The second refractive index is preferably greater than 1.4 or greater than 1.45. Most preferably, the second refractive index is between 1.4 and 1.6, for example 1.5. The second layer preferably has a third refractive index which is greater than the first refractive index and/or greater than the second refractive index. The third refractive index may be between 1.5 and 1.7.

In a preferred variant, an outer layer formed on the first surface of the first layer may be translucent or opaque. The outer layer here may serve in practical terms as a screen behind which the light source, optionally together with any driving electronics for the light source, may be hidden from the carrier layer arrangement side. The light source is thus preferably disposed on an opposite side of the outer layer from the first layer. In addition, the lighting component may contain a heating layer.

The outer layer preferably adjoins the light guide element, especially the input coupling section. In addition, the carrier layer arrangement may have one or more sections that are visually distinguishable from the remainder of the carrier layer arrangement. These sections may have, for example, different light transmittance, light reflection and/or light absorption characteristics from the remainder of the carrier layer arrangement. They may differ from the remainder of the carrier layer arrangement especially in terms of color or with regard to reflectivity, in order to form a pattern, image or symbol. The sections mentioned are preferably translucent or opaque.

The light source (or light sources) may be part of the lighting component. The light sources are preferably aligned such that they emit the light adjacent to the input coupling section of the light guide element along the first layer in each case in the direction of the corresponding input coupling section. In other words, the/each light source may have a main emission direction aligned along the first layer. Each light source may comprise one or more, especially mono- or polychromatic, light-emitting diodes or lasers, especially laser diodes.

The output coupling section may be formed on a first surface of the light guide element that faces the carrier layer arrangement or on a second surface of the light guide element that faces away from the carrier layer arrangement. The output coupling section may be light-scattering. The output coupling section preferably comprises scattering structures, for example in the form of beads, prisms, a fine grain or elevated surface roughness (Ra value, for example, up to 0.2 mm or up to 0.1 mm). In particular, it is conceivable that the output coupling section has been produced from the same material as the light guide element.

In a particularly preferred variant, the output coupling section is formed monolithically (in one piece) with the light guide element. If the output coupling section is disposed on the second surface of the light guide element, it may advantageously be formed as a surface structure in the polyurethane material. Such an output coupling section may be produced rapidly and easily during the injection molding, especially during a reactive injection molding operation, in which the cavity of the injection mold is flooded with the co-reactants for the polyurethane in liquid form and the co-reactants react by polyaddition to give polyurethane. The liquid mixture of the co-reactants may be comparatively mobile, such that even the finest surface structures can be generated by way of reactive injection molding. The lighting component may be designed to be radar-transparent, meaning that it can attenuate radar waves in the direction of propagation to a negligible degree at most.

The light coupled into the light guide element by way of the input coupling section may propagate under total reflection at the first surface of the light guide element or the second surface of the light guide element along the carrier layer arrangement, especially the first layer. At the interface with the first layer, total reflection occurs because of the difference between the first refractive index and the second refractive index. The second surface of the light guide element (at least in the region in which total reflection is desired) is preferably uncovered, such that total reflection can be implemented here via the difference between the second refractive index and the refractive index of the surrounding medium (especially air). When the light that propagates within the light guide element arrives in the output coupling section, it is preferably deflected by scatter in such a way that it hits the first surface of the light guide element/the first surface of the first layer at an angle of incidence (relative to the surface normal) which is smaller than the limiting angle of total reflection (called the critical angle). As a result, the light/light beam propagates directly through the material of the first layer, the interface between the first layer and second layer and the material of the second layer, in order to exit from the lighting component.

The transportation device proposed here may be a vehicle, especially a motor vehicle, and comprises at least one lighting component described in detail above. The carrier layer arrangement is preferably disposed on an outer face of the vehicle, and the light guide element on an inner face of the vehicle. In this way, the light outcoupled from the light guide element in the direction of the carrier layer arrangement may propagate through the carrier layer arrangement into the environment of the transportation device.

In a preferred variant, the lighting component of the transportation device comprises the light guide element described and one or more further light guide elements likewise formed from polyurethane on the first layer. Each of the further light guide elements has an assigned light source. One of the further light guide elements may be part of a vehicle light, for example a rear light, turn signal light or headlamp. The lighting component may be disposed in the region of a front of the transportation device, especially centrally or as part of a bumper cladding, in the region of a side wall of the transportation device, or in the region of a tail section of the transportation device.

The method proposed is intended for production of a lighting component described in detail above. It especially comprises the following steps: injecting a molding compound into a cavity of a first injection mold while the first injection mold is closed in order to form the carrier layer arrangement together with the first layer; providing the carrier layer arrangement in a cavity of a second injection mold; flooding the cavity of the second injection mold with a mixture, especially a liquid mixture, for production of polyurethane in a reactive injection molding operation, wherein the light guide element is formed on the first layer from the polyurethane.

The liquid mixture and/or the polyurethane may include additions (called additives). A dynamic viscosity (under standard conditions) of the liquid mixture is preferably less than 100 mPas, less than 20 mPas or less than 5 mPas, most preferably less than 2.5 mPas. The cavity of the second injection mold is preferably flooded after the (liquid-tight) carrier layer arrangement has been formed. The light guide element made of the polyurethane may thus be molded onto the carrier layer arrangement.

In addition, a receiving structure (receiving element(s)), for example a screw dome) for reception in a housing for the lighting component may be formed in a further method step by injection molding on the component produced as described above. The receiving structure is preferably manufactured from a thermoplastic.

The words "comprising", "having", "with" and the like that are used in this disclosure should not be considered to be conclusive. In particular, the wording "comprises a" in this context means "comprising at least one", i.e. "comprising a" does not mean that no further corresponding elements are present. Instead, the plural (comprising two or more) is likewise disclosed here. For example, the expressions "comprising a light guide element", "comprising a light source" and "comprising an input coupling section" should be understood such that the lighting component may have one or more light guide elements, one or more light sources, or one or more input coupling sections.

Preferred embodiments of a lighting component for a transportation device, the transportation device and a process for producing the lighting component will now be elucidated in more detail with reference to the appended schematic drawings that are not true to scale.

DETAILED DESCRIPTION OF THE DRAWINGS

Figure 1:
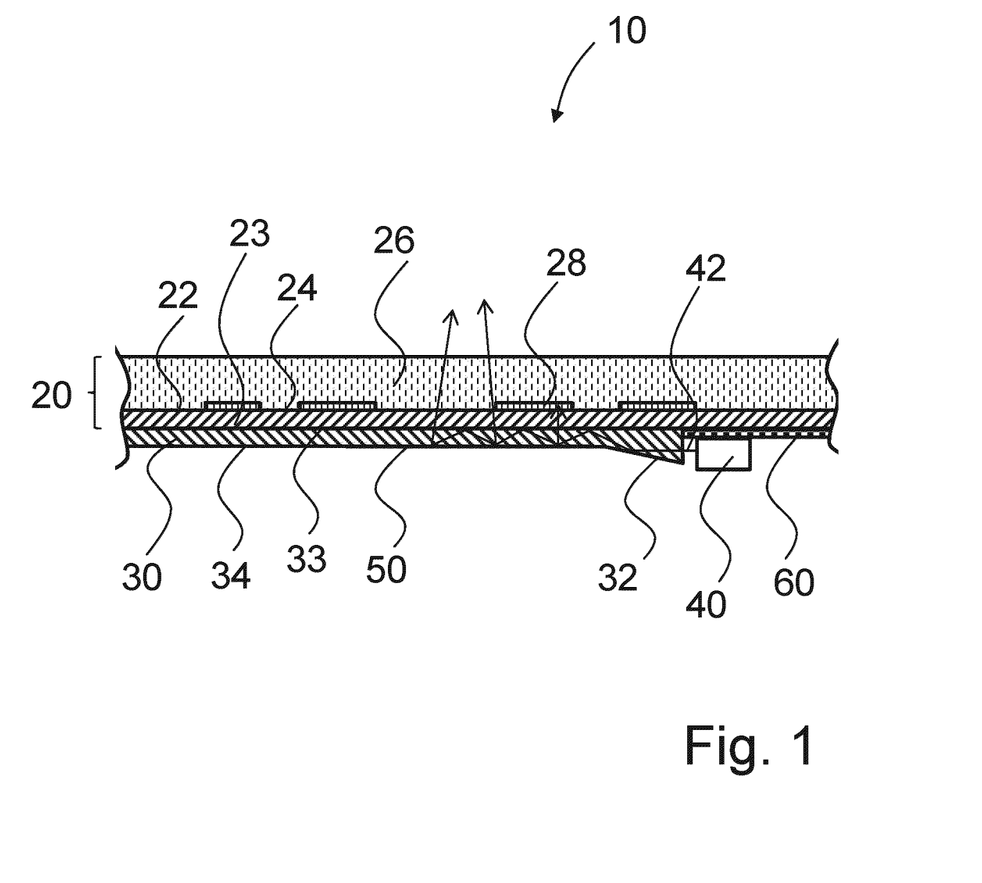
FIG. 1 shows a first embodiment of a lighting component in a cross-sectional view, where the light guide element takes the form of a flat light conductor.

FIG. 1 shows a lighting component 10 which is provided here by way of example on the front of a transportation device 100 in front of a vehicle sensor (here a radar sensor 102). The lighting component 10 comprises a carrier layer arrangement 20 on a front side of the lighting component 10 which is disposed at the top in FIG. 1, and a light guide element 30 in the form of a flat light guide and a light source 40 on a reverse side of the lighting component 10 which is disposed at the bottom in FIG. 1. The carrier layer arrangement 20 comprises a first layer 22 (on the reverse side) and a second layer 26 (on the front side). The lighting component 10 additionally contains a carrier layer 60 for visual covering/concealment of the light source 40. The visible side of the lighting component 10 at which light from the light source 40 leaves the lighting component 10 as intended is the front side.

The second layer 26 is designed as a thermoplastic molding, especially a transparent thermoplastic molding, in this variant made of polycarbonate, polymethylmethacrylate (MMA) or polyamide, and serves functionally as carrier layer for all other parts of the lighting component 10, especially for the first layer 22, the light guide element 30 and the light source 40. On its opposite surface from the first layer 22, the second 26 may have been provided with a protective layer not shown in the figures, especially what is called a hardcoat layer. The first layer 22 has been formed directly onto the second layer 26 areally and cohesively, and essentially in the form of a film, where the first layer 22 has a first surface 23 remote from the second layer 26 (interface with the second layer 26) and a second surface 24 facing the second layer 26. Of the first layer 22, the second layer 26 and the light guide element 30, the first layer 22 (called low refractive index, low-n, layer) has the lowest refractive index in order to ensure transmission of light within the (material of the) light guide element 30 by way of total reflection.

The light guide element 30 is shaped directly and cohesively (i.e. without an interlayer) at least in sections onto the first surface 23 of the first layer 22. The light guide element 30 takes the form of a polyurethane (a thermoset here). The polyurethane has a second refractive index which is greater than a first refractive index of the first layer 22. In this specific case, the first active index of the first layer 22 is 1.35, the second refractive index of the light guide element is 1.5, and a third refractive index of the second 26 is 1.58.

The opaque outer layer 60 is shaped here onto the first surface 23 of the first layer 22 and is formed from a thermoplastic, especially a polycarbonate, polymethylmethacrylate (PMMA) or polyamide. The outer layer 60 adjoins the light guide element 30. The light source 40 is disposed in such a way that it emits light 42 along the first surface 23 of the first layer 22 that faces the light guide element 30. The main emission direction of the light source 40 runs parallel here to the first layer 22. This enables a compact design and exact delimitation of the light-emitting region of the lighting component 10.

The light guide element 30 has an input coupling section 32 that tapers in a linear manner in the main emission direction of the light source 40 and adjoins the outer layer 60, with entry/input coupling of light 42 into the light guide element 30 in the region of a boundary between the input coupling section 32 and the outer layer 60. Subsequently, the light 42 propagates, generally under total reflection, at a first surface 33 of the light guide element 30 that faces the first layer 22 and a second surface 34 of the light guide element 30 that faces away from the first layer 22 with increasing distance from the light source 40. Since an output coupling section 50 is formed at the second surface of the light guide element 30, the light 42 is outcoupled from the input coupling section 32 along the light guide element 30 in the direction of the carrier layer arrangement 20 (visible side). The output coupling section 50 extends (two-dimensionally in this variant) across the second surface 34 of the light guide element 30 and is designed as a surface structure in the polyurethane material of the light guide element 30.

The first layer 22 is provided on its second surface 24 with two or more sections 28 that form a mask, in which light 42 that has passed out of the light guide element 30 is more strongly attenuated (absorbed, scattered or reflected) than in the remainder of the first layer 22. In particular, the sections 28 may have higher light absorption than the remainder of the first layer 22, than the light guide element 30 and/or than the second layer 26. The sections 28 together give rise to an image, pattern or symbol which is visible from the visible side. They may take the form of a print on the first layer.

Figure 2:
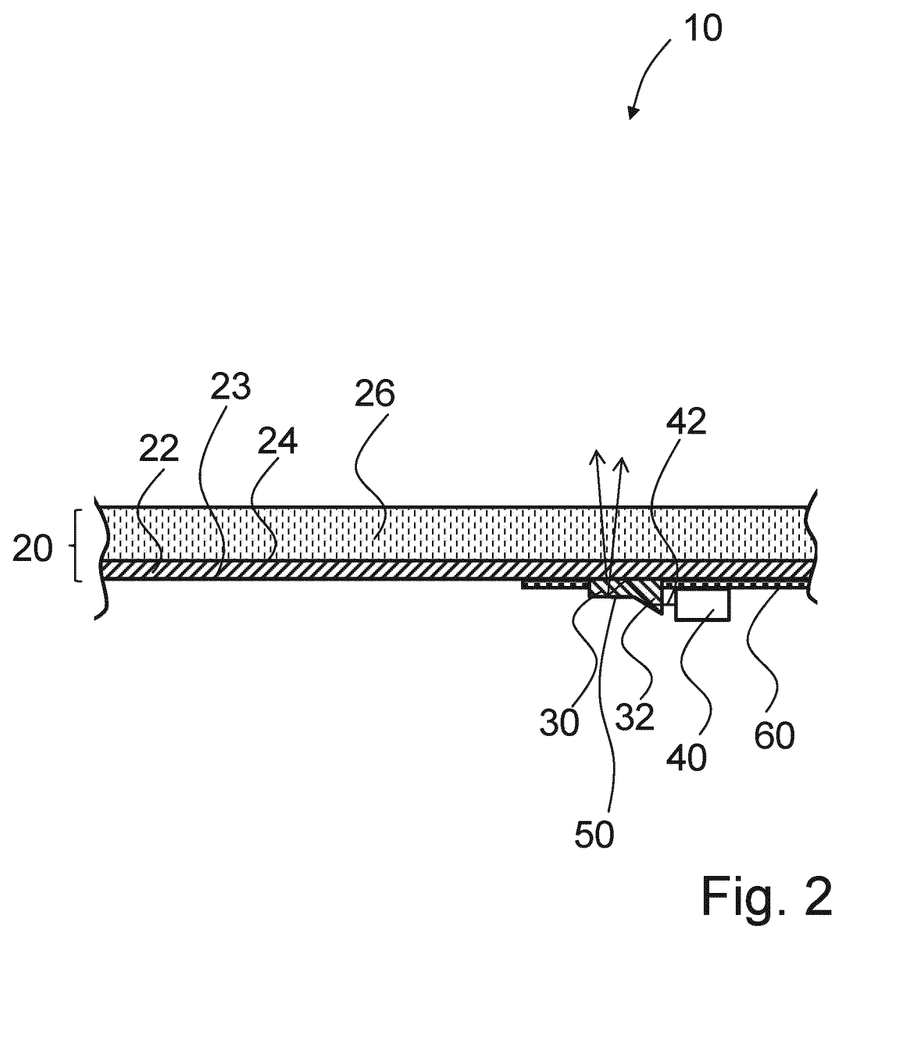
FIG. 2 shows a second embodiment of a lighting component in a cross-sectional view, where the light guide element takes the form of a light strip along the outline of the lighting component.

A lighting component 10 from FIG. 2 differs from the lighting component 10 according to FIG. 1 in that the light guide element 30 takes the form not of an areal light guide but of a light guide strip that extends here by way of example along a contour of the lighting component 10. The light guide strip is disposed in a recess 62 in the outer layer 60. In the cross-sectional view from FIG. 2, the material of the outer layer thus adjoins the input coupling section 32, and adjoins the light guide element 30 at an opposite end thereof from the input coupling section 32. In addition, the sections 28 not formed here by way of example. Moreover, the lighting component 10 from FIG. 2 has all the features of the lighting component 10 from FIG. 1. In particular, the light guide element 30 runs along the first surface 23 of the first layer 22.

Figure 3:
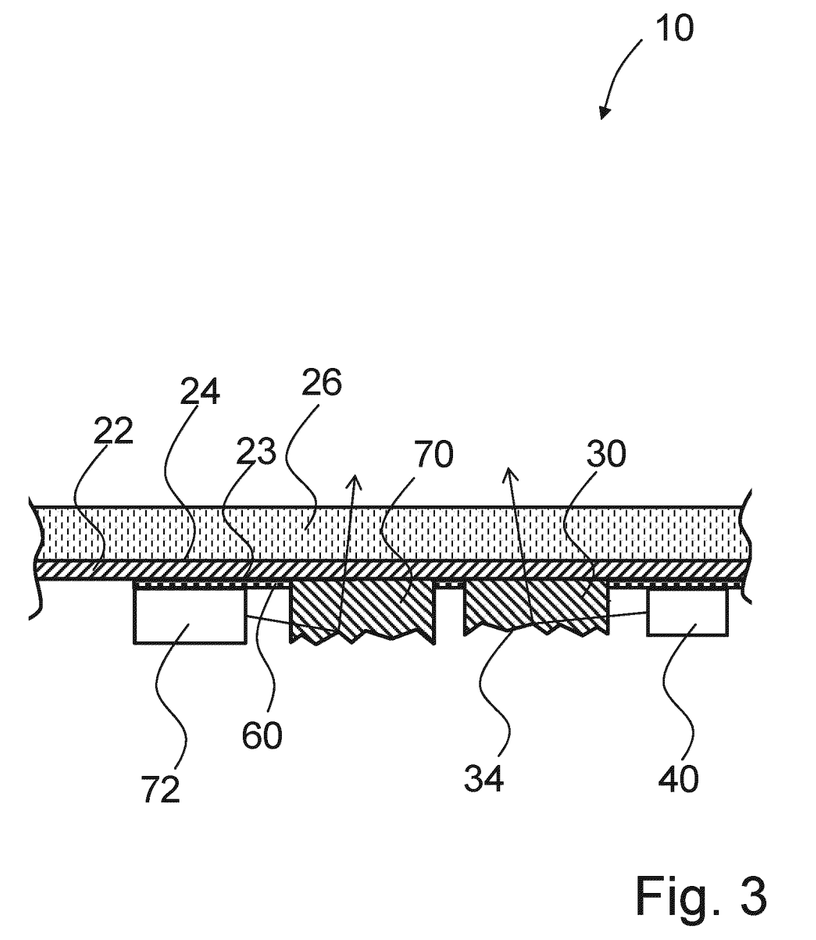
FIG. 3 shows a third embodiment of a lighting component in a cross-sectional view, where two or more light guide elements each with a corresponding light source are provided.

A further lighting component 10 from FIG. 3 differs from the lighting component 10 according to FIG. 2 in that the light guide element 30 takes the form not of a light guide strip but of a light guide block formed at its second surface 34 with a three-dimensional structure having a depth of more than 1 mm or more than 2 millimeters or more than 5 mm, and hence recognizable from the visible side as a three-dimensional structure. The three-dimensional structure may constitute a three-dimensional pattern, a three-dimensional symbol or a three-dimensional image. The output coupling section here too is shaped into the polyurethane material at the second surface 34 of the light guide element 30.

In addition, the lighting component 10 comprises a further light guide element 70 and a further light source 72, where the further light guide 70 and the further light source 72, with regard to their structure and function, may also have many, especially all, features of the light guide element 30 or of the light source 40 relative to the other parts of the lighting component. The further light differs by way of example from the light source 40 merely in the color of the light that it emits. For example, the light source 40 may emit yellow light for use as turn signal light, and the further light source 72 red or white light for use as front or rear light of a transportation device. In this variant, the light guide element 30 and the further light guide element 70 are disposed in corresponding recesses in the outer layer 60. Moreover, the lighting component 10 from FIG. 3 has all the features of lighting component 10 from FIG. 2.

Figure 4:
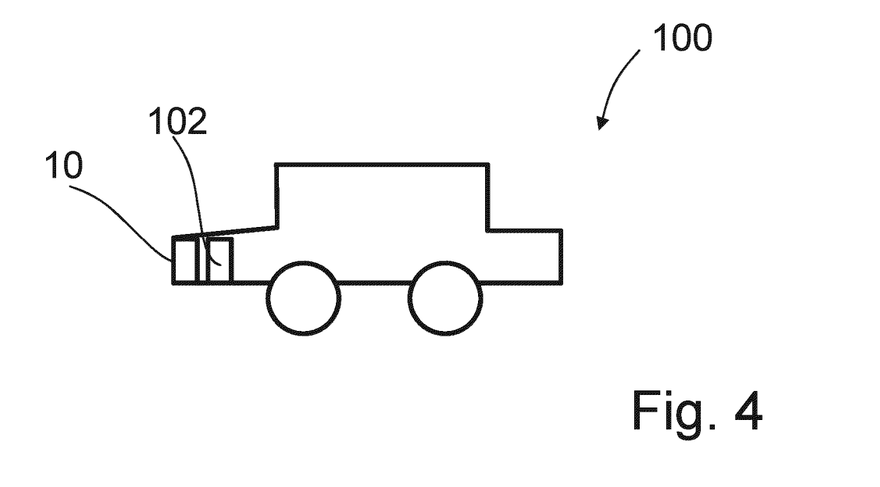
FIG. 4 shows an embodiment of a transportation device with the lighting component, wherein the lighting component is disposed in the region of the front of the transportation device.

The transportation device 100 (vehicle) shown in highly schematic form in FIG. 4 comprises a lighting component 10 according to any of FIGS. 1 to 3, mounted on the front of the transportation device 100. The lighting component 10 is arranged in such a way that the visible side/front side points outward, in the forward direction here relative to the transportation device. The light 42 emitted by the light source 40 is thus emitted in the forward direction from the lighting component 10 relative to the transportation device 100. In particular, the lighting component 10 may cover one or more sensors (for example the radar sensor 102), and the light source 40 may be moved laterally relative to the transportation device 100, such that the radar waves from the radar sensor propagate through the lighting component 10 past the light source 40 when they leave the transportation device 100.

Figure 5:
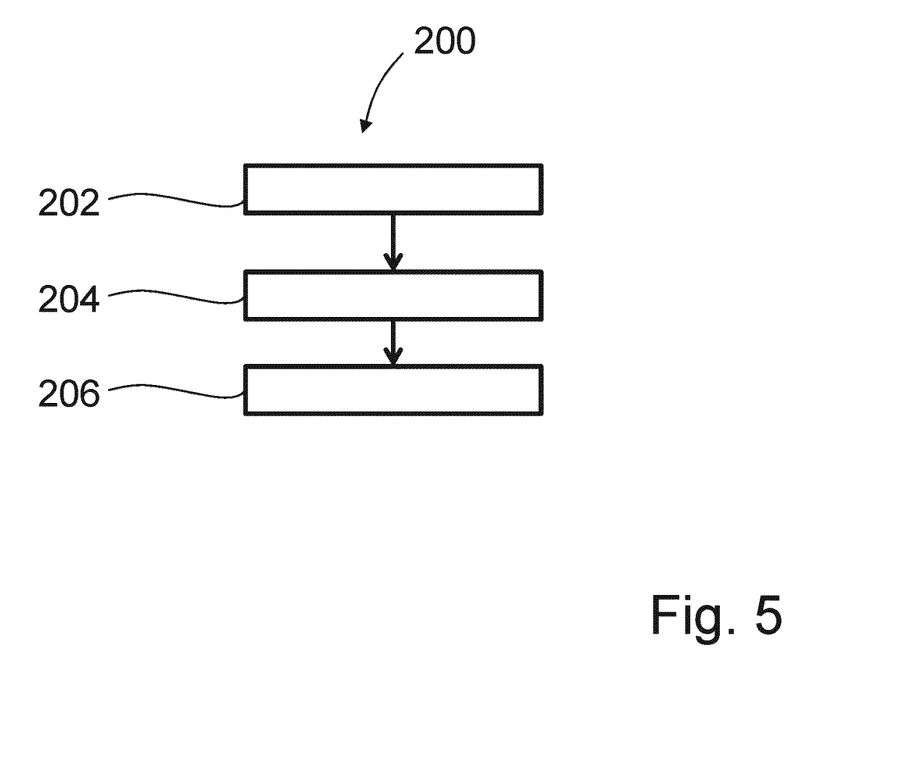
FIG. 5 shows an embodiment of a method of producing the lighting component.

The lighting component 10 according to any of FIGS. 1 to 3 may especially be produced by way of a method 200 shown schematically in FIG. 5, which comprises a (simple) injection molding operation and a reactive injection molding operation. In a first step 202, a first molding compound is injected into a cavity of a first injection mold while the first injection mold is closed, with injection of a second molding compound into the cavity simultaneously with the first molding compound. This results in formation of the carrier layer arrangement 20 with the first layer 22 and the second layer 26. The first molding compound is subjected to primary shaping here to form the first layer 22 (as a film), and the second molding compound to form the second layer 26. Subsequently, the carrier layer arrangement 20, in a step 204, is provided in a cavity of a second injection mold. This can be effected, for example, by moving the carrier layer arrangement 20. Then, in a step 206, the cavity of the second injection mold is flooded with a liquid, especially polyol- and polyisocyanate-containing, mixture for production of polyurethane in a reactive injection molding operation, wherein the light guide element 30 is formed on the first layer 22 from the polyurethane.

What is claimed is:

1. A lighting component for a transportation device, the lighting component comprising:
   a carrier layer arrangement which is transparent at least in sections and has a first layer, wherein the first layer has a first refractive index,
   a light guide element made of polyurethane on a first surface of the first layer, wherein the light guide element has a second refractive index greater than the first refractive index, and
   a translucent or opaque outer layer adjacent to the light guide element on a section of the first surface of the first layer, wherein:
   the light guide element has an input coupling section for input coupling of light from a light source into the light guide element and is configured to guide the coupled-in light along the first layer, and the lighting component further comprises an output coupling section configured to outcouple the light from the light guide element at least partly in a direction of the carrier layer arrangement.

2. The lighting component according to claim 1, wherein:
the carrier layer arrangement also has a second layer on a second surface of the first layer on an opposite side from the light guide element,
the second layer has a third refractive index greater than the first refractive index and/or greater than the second refractive index, and/or
the second layer takes a form of a thermoplastic.

3. The lighting component according to claim 2, wherein:
the second layer takes the form of the thermoplastic, and
the thermoplastic is a polycarbonate.

4. The lighting component according to claim 1, wherein the first refractive index is less than 1.45 and/or the second refractive index is greater than 1.45.

5. The lighting component according to claim 1, wherein:
the light guide element is formed at least in sections as a flat light guide layer on the first layer, and/or
the light guide element is formed at least in sections as an elongated light guide strip that extends along the first surface of the first layer.

6. The lighting component according to claim 1, wherein the light source is disposed on an opposite side of the outer layer from the first layer.

7. The lighting component according to claim 1, wherein:
the first layer has been provided with one or more essentially opaque sections on a second surface of the first layer, and
the second surface of the first layer is opposite to the first surface of the first layer.

8. The lighting component according to claim 1, further comprising the light source.

9. The lighting component according to claim 8, wherein the light source is aligned such that the light source emits light adjacent to the input coupling section of the light guide element along the first layer in the direction of the input coupling section.

10. The lighting component according to claim 1, wherein:
the output coupling section is formed on a first surface of the light guide element that faces the carrier layer arrangement or on a second surface of the light guide element that is remote from the carrier layer arrangement, and/or
the output coupling section is formed as a surface structure of the light guide element.

11. The lighting component according to claim 1, wherein:
the output coupling section is produced from the same material as the light guide element, and/or
the output coupling section is in one-piece or monolithic form together with the light guide element.

12. A transportation device comprising:
the lighting component according to claim 1, wherein:
the carrier layer arrangement is disposed on an outer face of the transportation devices and
the light guide element is disposed on an inner face of the transportation device.

13. A method of producing the lighting component according to claim 1, the method comprising:
injecting a molding compound into a first cavity of a first injection mold while the first injection mold is closed in order to form the carrier layer arrangement together with the first layer;
providing the carrier layer arrangement in a second cavity of a second injection mold; and
flooding the second cavity of the second injection mold with a mixture for production of polyurethane in a reactive injection molding operation,
wherein the light guide element is formed on the first layer from the polyurethane.

* * * * *